(12) United States Patent
Sun

(10) Patent No.: US 9,444,610 B2
(45) Date of Patent: Sep. 13, 2016

(54) METHOD AND DEVICE FOR DETECTING PRIMARY SYNCHRONIZATION SIGNAL

(71) Applicant: MStar Semiconductor, Inc., Hsinchu Hsien (TW)

(72) Inventor: Guo-Liang Sun, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 108 days.

(21) Appl. No.: 14/279,609

(22) Filed: May 16, 2014

(65) Prior Publication Data

US 2014/0349666 A1    Nov. 27, 2014

(30) Foreign Application Priority Data

May 21, 2013    (CN) .......................... 2013 1 0190560

(51) Int. Cl.
| H04L 7/00 | (2006.01) |
| H04L 7/04 | (2006.01) |
| H04W 56/00 | (2009.01) |

(52) U.S. Cl.
CPC . *H04L 7/00* (2013.01); *H04L 7/04* (2013.01); *H04L 7/042* (2013.01); *H04W 56/00* (2013.01)

(58) Field of Classification Search
CPC .......... H04L 7/00; H04L 7/04; H04L 7/042; H04W 56/00
See application file for complete search history.

(56) References Cited

U.S. PATENT DOCUMENTS

| 6,321,073 | B1 * | 11/2001 | Luz et al. ................. 455/239.1 |
| 7,366,471 | B1 * | 4/2008 | Kitchin ....................... 455/63.1 |
| 2004/0196926 | A1 * | 10/2004 | Chien et al. ................. 375/316 |
| 2005/0254560 | A1 * | 11/2005 | Huang .......................... 375/150 |
| 2008/0062865 | A1 * | 3/2008 | Neugebauer .......... H04W 88/04 370/229 |
| 2010/0226264 | A1 * | 9/2010 | Axmon et al. ................ 370/252 |
| 2010/0285826 | A1 * | 11/2010 | Bourdeaut ............ H04L 1/0003 455/513 |
| 2012/0307820 | A1 * | 12/2012 | Tomatis et al. ............... 370/350 |
| 2014/0036779 | A1 * | 2/2014 | Yang et al. .................... 370/328 |
| 2014/0126568 | A1 * | 5/2014 | Berggren .......... H04W 56/0015 370/350 |
| 2014/0273869 | A1 * | 9/2014 | Zhao ..................... H04W 24/08 455/67.11 |
| 2015/0003311 | A1 * | 1/2015 | Feuersaenger et al. ...... 370/311 |
| 2015/0245308 | A1 * | 8/2015 | Lorca Hernando ......... H04W 56/0015 |

FOREIGN PATENT DOCUMENTS

| CN | 101719889 | 6/2010 |
| CN | 102122997 | 7/2011 |
| CN | 102158249 | 8/2011 |

(Continued)

OTHER PUBLICATIONS

Taiwan Intellectual Property Office, "Office Action," Apr. 14, 2015.

(Continued)

*Primary Examiner* — David B. Lugo
(74) *Attorney, Agent, or Firm* — WPAT, PC; Justin King; Jonathan Chiang

(57) ABSTRACT

A method for detecting a primary synchronization is provided. The method includes: obtaining a time-domain signal sequence for synchronization; obtaining a correlation result corresponding to the time-domain signal sequence; normalizing the correlation result according to a received signal strength indicator corresponding to the time-domain signals; and sorting the normalized correlation result to ascertain a peak value position corresponding to the correlation result.

11 Claims, 7 Drawing Sheets

(56) References Cited

FOREIGN PATENT DOCUMENTS

| | | |
|---|---|---|
| CN | 102356671 | 2/2012 |
| CN | 102685878 | 9/2012 |
| WO | 2012167471 | 12/2012 |

OTHER PUBLICATIONS

Taiwan Intellectual Property Office (TIPO), Office Action issued Feb. 22, 2016.

* cited by examiner

METHOD AND DEVICE FOR DETECTING PRIMARY SYNCHRONIZATION SIGNAL

This application claims the benefit of People's Republic of China application Serial No. 201310190560.3, filed May 21, 2013, the subject matter of which is incorporated herein by reference.

BACKGROUND OF THE INVENTION

1. Field of the Invention

The invention relates in general to a wireless communication technology field, and more particularly to a method and device for detecting a primary synchronization signal.

2. Description of the Related Art

Long-Term Evolution (LTE) wireless communication systems, featuring a fast transmission rate, high spectra utilization efficiency and simple receivers, are regarded as a next-generation mainstream communication technology. In an LTE system, when a receiving terminal moves from a coverage range of one base station to a coverage range of another base station, the receiving terminal may implement hand-over/hand-off between the base stations through detecting primary synchronization signals transmitted from different base stations.

In an LTE system, the primary synchronization signal occurs in repetition every 5 ms. That is, the primary synchronization signal occurs in every half frame in 10 ms LTE frames.

To detect the primary synchronization signal, computations including correlation calculation, frequency offset elimination calculation and calculation for received signal strength indicators (RSSIs) need to be performed on data of wireless frames received by an antenna of the receiving terminal. Such computations involve immense amounts of addition, multiplication and division, and such colossal amounts of computations easily lead to a delay in the time point at which the primary synchronization signal is detected. Thus, the hand-over/hand-off between base stations cannot be timely implemented, and users may experience such performance degradation.

Therefore, there is a need for a solution that timely detects the primary synchronization signal and realizes a smooth hand-over/hand-off between base stations without a user noticing the hand-over/hand-off.

SUMMARY OF THE INVENTION

The invention is directed to a method and device for detecting a primary synchronization signal capable of timely detecting the primary synchronization signal and thus realizing a smooth hand-over/hand-off between base stations without a user noticing the hand-over/hand-off.

According to the present invention, a device for detecting a primary synchronization signal is provided. The device includes: a capturing and storage module, configured to obtain a time-domain signal sequence for synchronization; a correlation module, connected to the capturing and storage module, configured to obtain a correlation result corresponding to the time-domain signal sequence, wherein the correlation result refers to a value obtained by performing a sliding correlation on the time-domain signal sequence; a normalization module, connected to the correlation module, configured to normalize the correlation value according to a received signal strength indicator corresponding to the time-domain signals to obtain a ratio of the correlation result to the received signal strength indicator; and a sorting module, connected to the normalization module, configured to sort the normalized correlation result to ascertain a peak value position corresponding to the correlation result, wherein the peak value position is a position of the primary synchronization signal.

According to the present invention, a method for detecting a primary synchronization signal is provided. The method includes: obtaining a time-domain signal sequence; obtaining a correlation result corresponding to the time-domain signal sequence, wherein the correlation result is a value obtained by performing a sliding correlation on the time-domain signal sequence; normalizing the correlation result according a received signal strength indicator corresponding to the time-domain signals to obtain a ratio of the correlation result to the received signal strength indicator; and sorting the normalized correlation result to ascertain a position of a peak value position corresponding to the correlation result, wherein the position of the peak value is a position of the primary synchronization signal.

The benefits of the present invention are that, different from the prior art, with the above device and method, the present invention is capable of timely detecting the primary synchronization signal and thus smoothly realizing a hand-over/hand-off between base stations without a user noticing the hand-over/hand-off.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
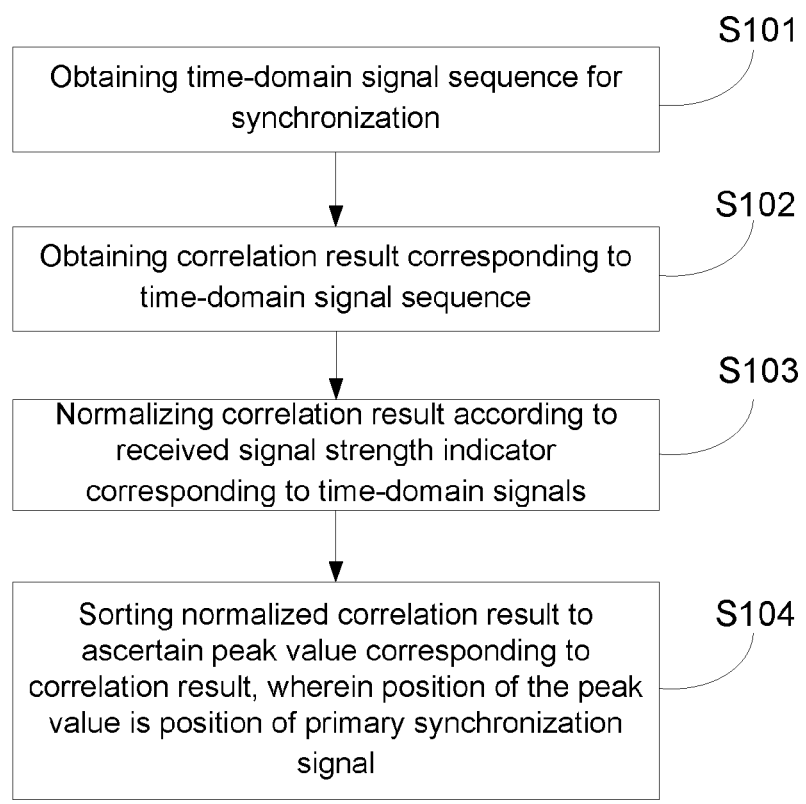
FIG. 1 is a flowchart of a method for detecting a primary synchronization signal according to a first embodiment of the present invention.

FIG. 1 shows a flowchart of a method for detecting a primary synchronization signal according to a first embodiment of the present invention. It should be noted that, given substantially the same results are obtained, the method of the present invention is not limited performing steps in FIG. 1 according to the sequence shown in FIG. 1. Referring to FIG. 1, the method includes the following steps.

In step S101, a time-domain signal sequence for synchronization is obtained. In step S101, a receiving terminal receives signals transmitted from a base station, and obtains a time-domain signal sequence by sampling the signals transmitted from the base station according to a predetermined sampling frequency. For example, the sampling frequency is greater than 1.4 MHz. Taking a 1.92 MHz sampling frequency for example, as the primary synchronization signal appears at an interval of 5 ms, the sequence that the receiving terminal obtains is the time-domain signal sequence having a length of 9600 sampling points. The above value, as well as other values in the following description, is an example for explaining the present invention, not limiting the present invention.

In step S102, a correlation result corresponding to the time-domain signal sequence is obtained. In step S102, the correlation result refers to a value obtained by performing a sliding correlation on the time-domain signal sequence. The receiving terminal sequentially reads the sampling points in the time-domain signal sequence according to a predetermined clock cycle, and performs the correlation operation on three sets of local characteristic sequences each time when one sampling point is read to obtain the correlation result corresponding to that sampling point. Taking a 1.92 MHz sampling frequency for example, the correlation result is a sequence having a length of 9600×3 points.

In step S103, the correlation result is normalized according to a received signal strength indicator corresponding to the time-domain signals. In step S103, the normalization is for obtaining a ratio of the correlation result to the received signal strength indicator.

In the embodiment, the step of obtaining the received signal strength indicator corresponding to the time-domain signal sequence and the step of obtaining the correlation result are performed in parallel in a same clock cycle to increase the speed of detecting for the primary synchronization signal.

In step S104, the normalized correlation result is sorted to ascertain a peak value corresponding to the correlation result. A position of the peak value is a position of the primary synchronization signal. In step S104, the normalized correlation results are sorted in a decreasing order, and a position of the maximum correlation result is a position of the primary synchronization signal.

When the receiving terminal moves from a coverage range of one base station to a coverage range of another base station, as base stations consistently transmit signals and signals transmitted from different base station are different, by comparing sizes of peak values of the correlation results under different signal strengths, i.e., by comparing the sizes of the peak values of the normalized correlation results (which is equivalent to comparing sizes of the primary synchronization signals), the receiving terminal may select a most appropriate base station for a smooth hand-over/hand-off, thereby enhancing user experiences.

With the above embodiment, in the method for detecting the primary synchronization signal according to the first embodiment of the present invention, by performing the steps of obtaining the received signal strength indicator corresponding to the time-domain signal sequence and the step of obtaining the correlation result in parallel in the same clock cycle, the primary synchronization signal can be timely detected to thus realize a smooth hand-over/hand-off between base stations.

Figure 2:
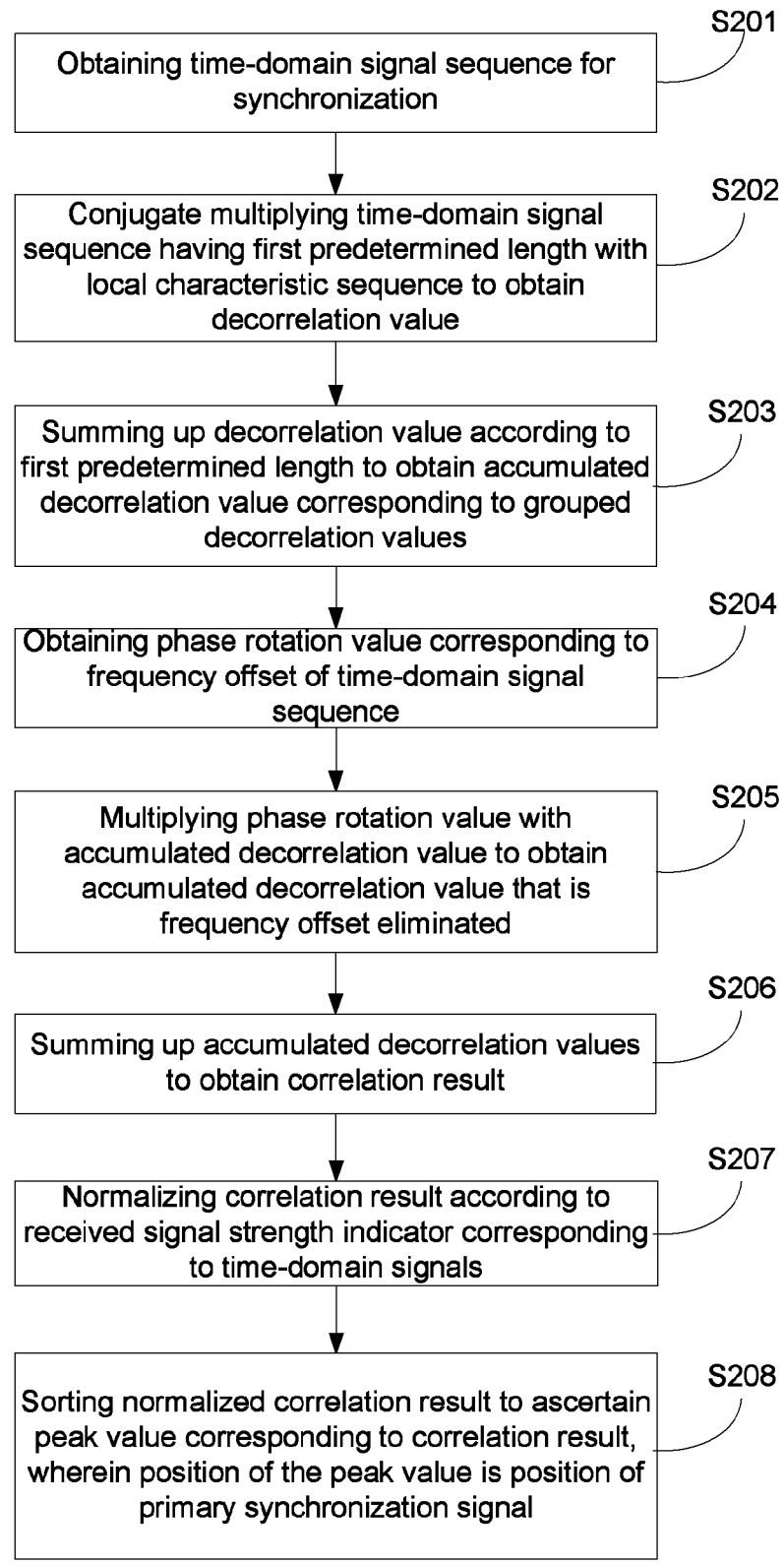
FIG. 2 is a flowchart of a method for detecting a primary synchronization signal according to a second embodiment of the present invention.

FIG. 2 shows a flowchart of a method for detecting a primary synchronization signal according to a second embodiment of the present invention. It should be noted that, given substantially the same results are obtained, the method of the present invention is not limited performing steps in FIG. 2 according to the sequence shown in FIG. 2. Referring to FIG. 2, the method includes the following steps.

In step S201, a time-domain signal sequence for synchronization is obtained.

In the embodiment, details of step S201 are similar to those of step S101 in FIG. 1, and shall be omitted herein.

In step S202, the time-domain signal sequence having a first predetermined length is conjugate multiplied with a local characteristic sequence to obtain a decorrelation value. In step S202, a receiving terminal sequentially obtains sampling points in the time-domain signal sequence having a first predetermined length, and conjugate multiplies the sampling points having the first predetermined length with a local characteristic sequence to obtain a decorrelation value. For example, assume that the first predetermined length is 64 points, and a time-domain signal sequence y(n) is a sequence having a length of 9600 sampling points, i.e., n has a value of 0, 1, 2, . . . , 9600−1. The receiving terminal obtains 64 sampling points, i.e., y(0), y(1), . . . , y(63), from the time-domain signal sequence according to a predetermined clock cycle, and conjugate multiplies the 64 sampling points y(0), y(1), . . . , y(63) with three sets of local characteristic sequences each having 64 points, respectively, to obtain a decorrelation result corresponding to the $1^{st}$ sampling point. The decorrelation value is a sequence having a length of 64.

Each time one sampling point is added, i.e., each time a new sampling point is obtained according to the predetermined clock cycle, a sliding movement is performed backward to perform the conjugate multiplication with three sets of local characteristic sequences on the basis of the first predetermined length. In continuation of the above example, when the receiving terminal receives the $65^{th}$ sampling point, i.e., y(64), the 64 sampling points y(1) to y(64) are conjugate multiplied with the three sets of 64-point local characteristic sequences, respectively, to obtain a decorrelation value corresponding to the $2^{nd}$ sampling point. When the receiving terminal receives the $66^{th}$ sampling point, i.e., y(65), the 64 sampling points y(2) to y(65) are conjugate multiplied with the three sets of 64-point local characteristic sequences, respectively, to obtain a decorrelation value corresponding to the third sampling point, and so forth, until a decorrelation value corresponding to the last sampling point (i.e., the $(9600-1)^{th}$) is obtained.

In practice, the first predetermined length is generally a multiple of 64, e.g., 64 and 128. The local characteristic sequences are three sequences having different root values, which are 25, 29 and 34, respectively.

In step S203, the decorrelation values are grouped and summed according to the first predetermined length to obtain accumulated decorrelation values corresponding to the grouped decorrelation values, respectively. More specifically, in continuation of the above example, in step S203, the 64 decorrelation values corresponding to the $1^{st}$ sampling points are grouped into 16 groups each consisting of four decorrelation values. Alternatively, for example, the 64 correlation values may also be grouped into eight groups each consisting of eight decorrelation values.

Assume that the 64 decorrelation values are r(0), r(1), . . . , r(63). In an example of dividing the 64 decorrelation into 16 groups each consisting of four decorrelation values, r(0) to r(3) are grouped into one group, r(4) to r(7) are grouped into one group, and so forth, until r(60) to r(63) are also grouped into one group to form a total of 16 groups.

The four decorrelation values in each of the 16 groups are summed up to obtain 16 accumulated decorrelation values. More specifically, the $1^{st}$ decorrelation is a sum of the decorrelation values r(0) to r(3), i.e., r(0)+r(1)+r(2)+r(3); the $2^{nd}$ accumulated decorrelation value is a sum of r(4) to r(7), and so forth. The $16^{th}$ accumulated decorrelation value is a sum of the decorrelation values r(60) to r(63).

By performing grouped calculations on the decorrelation values, parallel calculations can be performed on the grouped decorrelation values, thereby significantly saving the computation time.

In step S204, a phase rotation value corresponding to a frequency offset of the time-domain signal sequence is obtained. In step S204, a phase rotation value obtained from a frequency offset is stored in a dynamic random access memory (SRAM) or a dynamic random access memory (DRAM). The phase rotation value is a real part and an imaginary part of the phase rotation corresponding to the frequency offset, i.e., sine and cosine values corresponding to the frequency offset.

In the embodiment, sine and cosine values of all possible phase rotations within a corresponding frequency range are simulated by algorithm software and stored in a phase rotation memory. After obtaining the frequency offset of the time-domain signal sequence, the corresponding phase rotation value can be obtained by looking up a look-up table in the phase rotation memory. As the phase rotation value is sine and cosine values, calculations for obtaining the sine and cosine values can be eliminated from the frequency offset correction procedure for the time-domain signal sequence, and so the computation speed can be significantly increased.

In step S205, the phase rotation value is multiplied with the accumulated decorrelation value to obtain an accumulated decorrelation value that is frequency offset eliminated. In step S205, the phase rotation value corresponds to three different frequency offsets—f1=9 KHz, f2=0 and f3=−9 KHz. The phase rotation values corresponding to the three different frequency offsets are multiplied with the accumulated decorrelation value in parallel, thereby significantly saving the computation time.

In step S206, the accumulated decorrelation values are summed up to obtain a correlation result. In step S206, in continuation of the above example, assuming that the 16 accumulated decorrelation values are h(0), h(1), . . . , h(15), the correlation result is the sum of the 16 accumulated decorrelation values, i.e., h(0)+h(1) . . . +h(15).

In the embodiment, since the local characteristic sequences are three sequences of different root values, and the phase rotation value corresponds to three different frequency offsets, the correlation result corresponding to one sampling point is nine different values.

In step S207, the correlation result is normalized according to a received signal strength indicator corresponding to the time-domain signals.

In the embodiment, details of step S207 are similar to those of step S103 in FIG. 1, and shall be omitted herein.

In step S208, the normalized correlation result is sorted to ascertain a peak value corresponding to the correlation result. A position of the peak value is a position of the primary synchronization signal. In step S208, in continuation of the above example, the normalized correlation results yield a total of 9600×9 values. After sorting the normalized correlation results, the receiving terminal selects the first 32 peak values, and position of these 32 peak values are positions of the primary synchronization signals.

Further, the frequency offsets corresponding to the 32 peak values, the root values of the local characteristic sequences, and the position corresponding to the $1^{st}$ sampling point in the time-domain signal sequence are written into the memory for subsequent processing.

With the above embodiment, in the method for detecting the primary synchronization signal according to the second embodiment of the present invention, the phase rotation value is obtained by grouping the decorrelation values, performing parallel calculations and implementing the look-up table. Therefore, the computation speed is increased, and the primary synchronization signal can be timely detected to thus realize a smooth hand-over/hand-off between base stations.

Figure 3:
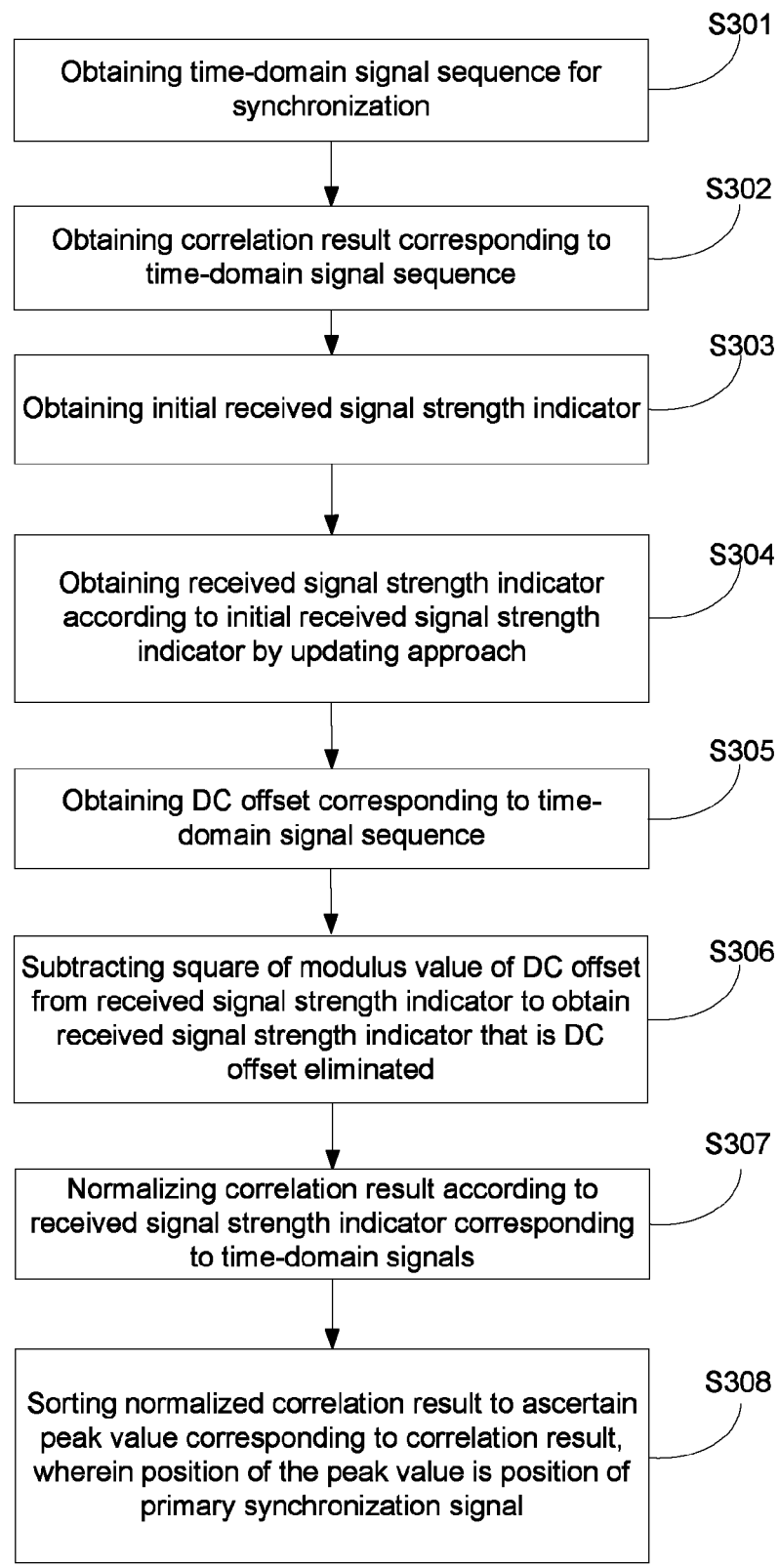
FIG. 3 is a flowchart of a method for detecting a primary synchronization signal according to a third embodiment of the present invention.

FIG. 3 shows a flowchart of a method for detecting a primary synchronization signal according to a third embodiment of the present invention. It should be noted that, given substantially the same results are obtained, the method of the present invention is not limited performing steps in FIG. 3 according to the sequence shown in FIG. 3. Referring to FIG. 3, the method includes the following steps.

In step S301, a time-domain signal sequence for synchronization is obtained.

In the embodiment, a time-domain signal sequence y(n) having a length of 9600 sampling points is taken as an example.

In step S302, a correlation result corresponding to the time-domain signal sequence is obtained.

In the embodiment, for example, a first predetermined length is 64, and the correlation result is a result of sliding correlation of 64 sampling points.

In step S303, an initial received signal strength indicator is obtained. In step S303, a received signal strength indicator $RSSI_{init}$ is obtained according to an equation:

$$RSSI_{init} = \sum_n |y(n)|^2,$$

where i is the number of points of an updating interval of the received signal strength indicator.

More specifically, in continuation of the above example, assuming i is equal to 2, the step of obtaining the initial received signal strength indicator includes the following. Two pre-sampled sampling points are obtained. The two pre-sampled sampling points are last two sampling points in a previous 5 ms time-domain signal sequence, and are denoted as y(−2) and y(−1). The first 63 sampling points of the current time-domain signal sequence, y(0) to y(62), are obtained. Next, a sum of squares of modulus values of the 64 sampling points is obtained to obtain the initial received signal strength indicator $RSSI_{init}$ corresponding to y(−2) and y(−1), respectively. That is, $$RSSI_{init}(-2) = \sum_{n=-2}^{61} |y(n)|^2 \text{ and } RSSI_{init}(-1) = \sum_{n=-1}^{62} |y(n)|^2$$

are obtained.

In step S304, the received signal strength indicator is obtained according to the initial received signal strength indicator by an updating approach. In step S304, according to an equation:

$$RSSI(m+i) = RSSI(m) + \sum_{n=m}^{m+i-1} |y(N+n)|^2 - \sum_{n=m}^{m+i-1} |y(n)|^2,$$

the received signal strength indicator corresponding to the time-domain signal sequence is obtained. In the above equation, y(n) is the time-domain signal sequence, RSSI(m) is the received signal strength indicator corresponding to the time-domain signal sequence, n and m are integers corresponding to the $n^{th}$ and $m^{th}$ sampling points, and N is the first predetermined length.

In continuation of the above example, each time one sampling point is read according to a predetermined clock cycle, the received signal strength indicator, instead of reading the sampling values of 64 points and summing up the sampling values of the 64 points, can be obtained according to the previous received signal strength indicator by an updating approach.

More specifically, after obtaining the $64^{th}$ sampling point, i.e., y(63), the received signal strength indicator RSSI(0) corresponding to the $1^{st}$ sampling point is obtained according to the initial received signal strength indicator $RSSI_{init}$(−2). That is:

$$RSSI(0)=RSSI_{init}(-2)+|y(62)|^2+|y(63)|^2-|y(-2)|^2-|y(-1)|^2$$

After obtaining the $65^{th}$ sampling point, i.e., y(64), the received signal strength indicator RSSI(1) corresponding to the $2^{nd}$ sampling point is obtained according to the initial received signal strength indicator $RSSI_{init}$(−1). That is:

$$RSSI(1)=RSSI_{init}(-1)+|y(63)|^2+|y(64)|^2-|y(-1)|^2-|y(0)|^2$$

After obtaining the $66^{th}$ sampling point, i.e., y(65), the received signal strength indicator RSSI(2) corresponding to the $3^{rd}$ sampling point is obtained according to the received signal strength indicator $RSSI_{init}$(0) corresponding to the $1^{st}$ sampling point. That is:

$$RSSI(2)=RSSI(0)+|y(64)|^2+|y(65)|^2-|y(0)|^2-|y(1)|^2$$

After obtaining the $67^{th}$ sampling point, i.e., y(66), the received signal strength indicator RSSI(3) corresponding to the $4^{th}$ sampling point is obtained according to the received signal strength indicator $RSSI_{init}$(1) corresponding to the $2^{nd}$ sampling point. That is:

$$RSSI(3)=RSSI(1)+|y(65)|^2+|y(66)|^2-|y(1)|^2-|y(2)|^2$$

The received signal strength indicators corresponding to other sampling points can be accordingly obtained.

In step S305, a DC offset corresponding to the time-domain signal sequence is obtained. In step S305, according to an equation:

$$DC\_offset = \sum_n y(n),$$

a DC offset DC_offset corresponding to the time-domain signal sequence is obtained.

In the embodiment, the operation for obtaining the DC offset and the operation for obtaining the received signal strength indicator are simultaneously performed within the same clock cycle. That is to say, each time when the receiving terminal reads one sampling point according to the predetermined clock cycle, the updated DC offset and received signal strength indicator of that sampling point are also obtained at the same time.

In step S306, a square of a modulus value of the DC offset is subtracted from the received signal strength indicator to obtain the received signal strength indicator that is DC offset eliminated. In step S306, as the DC offset is interferences induced by base station signals broadcasted in space rather than information of the base station, a square of a modulus value of the DC offset is subtracted from the received signal strength indicator obtained in step S304 to obtain the correct received signal strength indicator.

In step S307, the correlation result is normalized according to the received signal strength indicator corresponding to the time-domain signals. In step S307, a reciprocal of the received signal strength indicator that is DC offset eliminated is obtained by Newton iteration, and the correlation result is multiplied by the reciprocal of the received signal strength indicator that is DC offset eliminated to obtain a normalized correlation result.

In the embodiment, by adopting Newton iteration to obtain the reciprocal of the received signal strength indicator that is DC offset eliminated, division can be eliminated to significantly increase the computation speed.

In step S308, the normalized correlation result is sorted to ascertain a peak value corresponding to the correlation value. A position of the peak value is a position of the primary synchronization signal.

In the embodiment, details of step S308 are similar to those of step S104 in FIG. 1, and shall be omitted herein.

With the above embodiment, in the method for detecting the primary synchronization signal according to the third embodiment of the present invention, the received signal strength indicator is obtained by an updating approach, the operation for obtaining the DC offset and the operation for obtaining the received signal strength indicator are simultaneously performed within one clock cycle, and the reciprocal of the received signal strength indicator that is DC offset eliminated is obtained by Newton iteration to eliminate division calculations. Therefore, in addition to increasing the computation speed, the primary synchronization signal can be timely detected to thus realize a smooth hand-over/hand-off between base stations.

Figure 4:
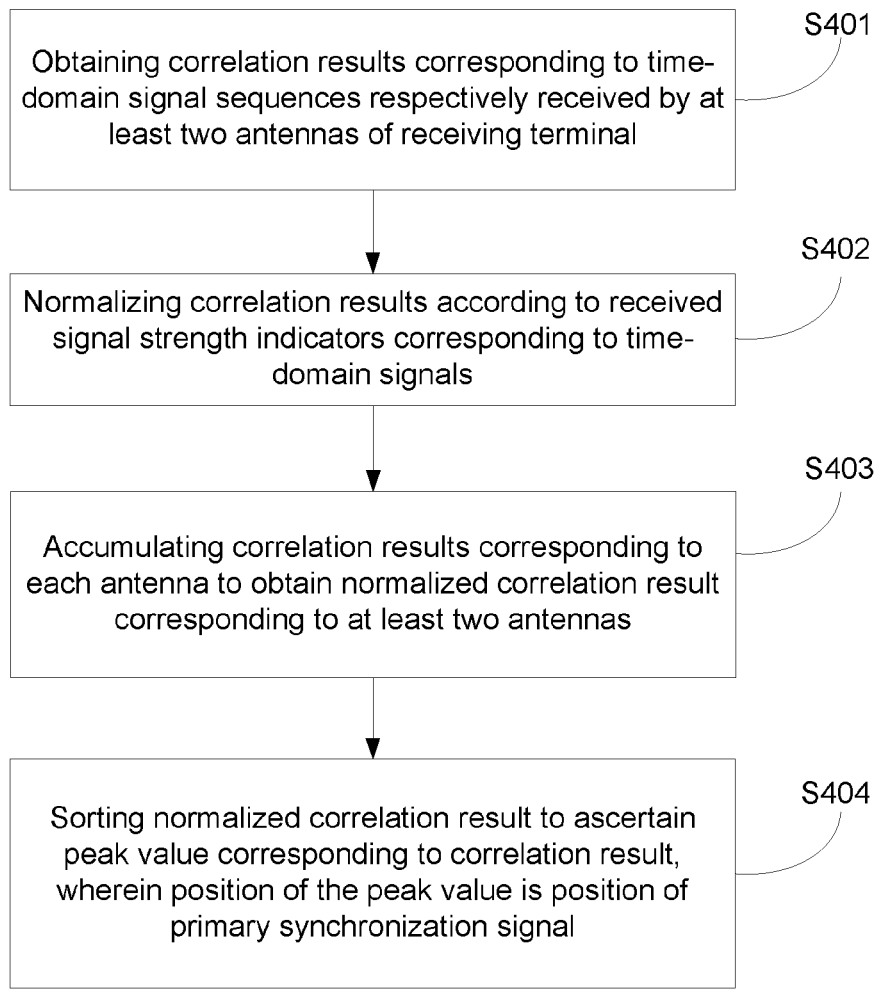
FIG. 4 is a flowchart of a method for detecting a primary synchronization signal according to a fourth embodiment of the present invention.

FIG. 4 shows a flowchart of a method for detecting a primary synchronization signal according to a fourth embodiment of the present invention. It should be noted that, given substantially the same results are obtained, the method of the present invention is not limited performing steps in FIG. 4 according to the sequence shown in FIG. 4. Referring to FIG. 4, the method includes the following steps.

In step S401, correlation results respectively corresponding to time-domain signal sequences received by at least two antennas of a receiving terminal are obtained. In step S401, a receiving terminal includes at least two antennas that simultaneously receive signals transmitted from base stations.

Take an example of a receiving terminal including two antennas, and assume that time-domain signal sequences received by the two antennas are $y_1(n)$ and $y_2(n)$, respectively. In step S401, respective correlation results corresponding to the time-domain signal sequences $y_1(n)$ and $y_2(n)$ are obtained by a grouped method and parallel calculations.

In step S402, the correlation results are normalized according to received signal strength indicators corresponding to the time-domain signals. In step S402, in continuation of the above example, after obtaining the received signal strength indicators corresponding to the time-domain signal sequences $y_1(n)$ and $y_2(n)$ by an updating approach, respective ratios of the correlation results to the received signal strength indicators are obtained to obtain respective normalized correlation results corresponding to the two antennas.

In step S403, the normalized correlation results corresponding to the antennas are summed up to obtain a normalized correlation result corresponding to at least two antennas. In step S403, by detecting the primary synchronization signal according to a sum of the normalized correlation results of two antennas, a detection error can be reduced and a detection accuracy can be increased.

In step S404, the normalized correlation result is sorted to ascertain a peak value corresponding to the correlation result. A position of the peak value is a position of the primary synchronization signal.

In the embodiment, details of step S404 are similar to those of step S104 in FIG. 1, and shall be omitted herein.

With the above embodiment, in the method for detecting the primary synchronization signal according to the fourth embodiment of the present invention, the primary synchronization signal is detected according to a sum of the normalized correlation results corresponding to at least two antennas. As such, a detection error can be reduced and a detection accuracy can be increased, thereby precisely detecting the primary synchronization signal. Further, by obtaining the correlation results corresponding to at least two antennas by parallel calculations implemented through a grouping method and obtaining the received signal strength indicator by an updating approach, the computation speed is increased, and the primary synchronization signal can be timely detected to thus realize a smooth hand-over/hand-off between base stations.

Figure 5:
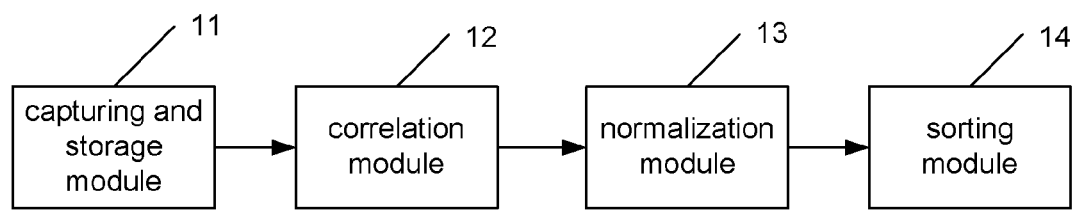
FIG. 5 is a schematic diagram of a device for detecting a primary synchronization signal according to the first embodiment of the present invention.

FIG. 5 shows a schematic diagram of a device for detecting a primary synchronization signal according to the first embodiment of the present invention. As shown in FIG. 5, a device for detecting a primary synchronization signal includes a capturing and storage module 11, a correlation module 12, a normalization module 13 and a sorting module 14.

The capturing and storage module 11 obtains a time-domain signal sequence for synchronization.

The correlation module 12, coupled to the capturing and storage module 11, obtains the time-domain signal sequence from the capturing and storage module 11, and obtains a correlation result corresponding to the time-domain signal sequence. The correlation result refers to a value obtained from performing a sliding correlation on the time-domain signal sequence.

The normalization module 13, coupled to the correlation module 12, normalizes the correlation result according to a received signal strength indicator corresponding to time-domain signals to obtain a ratio of the correlation result to the received signal strength indicator.

The sorting module 14, coupled to the normalization module 13, obtains the normalized correlation result from the normalization module 13, and sorts the normalized correlation result to ascertain a position of a peak value corresponding to the correlation result. The position of the peak value is a position of the primary synchronization signal.

Figure 6:
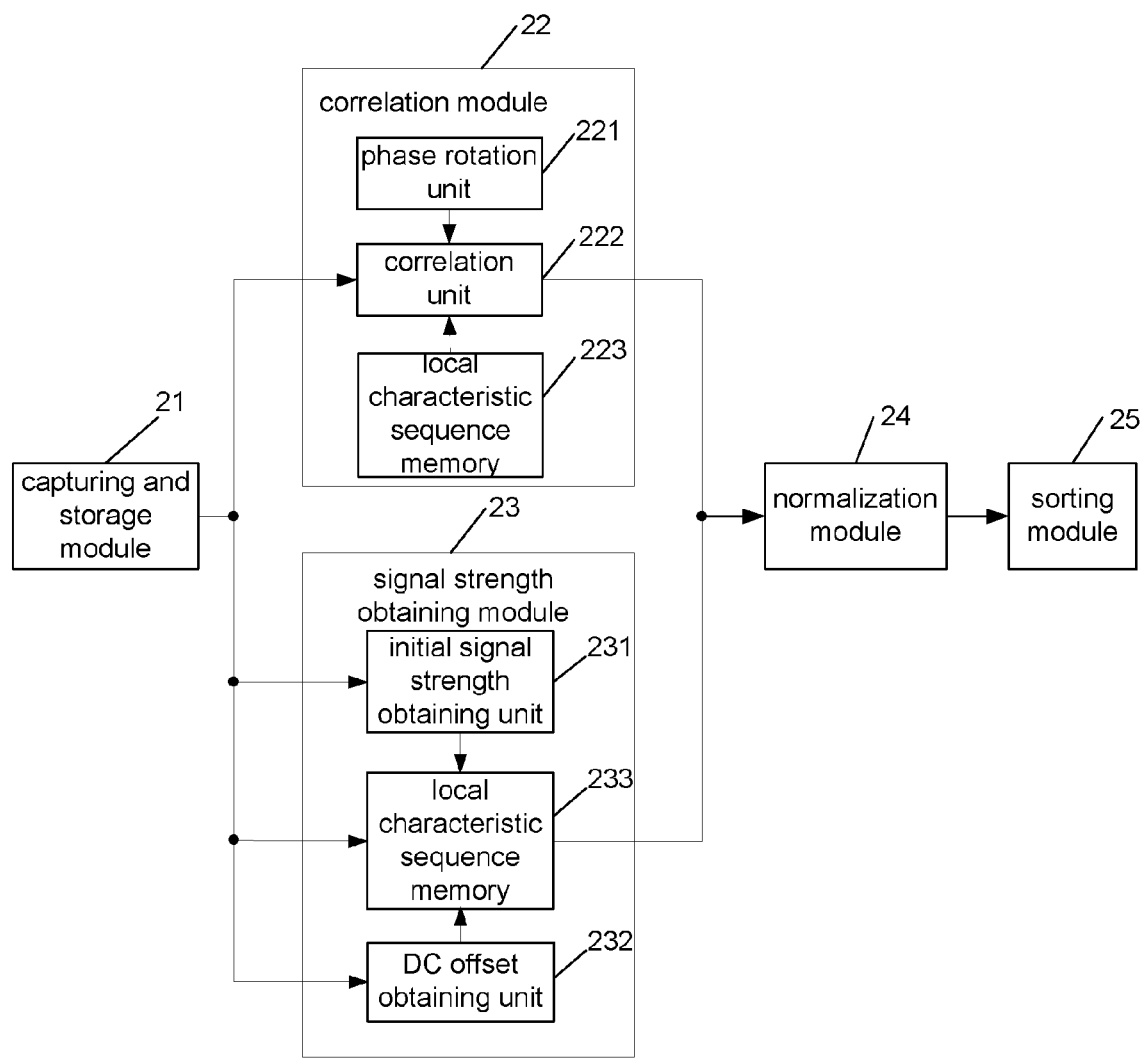
FIG. 6 is a schematic diagram of a device for detecting a primary synchronization signal according to the second embodiment of the present invention.

FIG. 6 shows a schematic diagram of a device for detecting a primary synchronization signal according to the second embodiment of the present invention. As shown in FIG. 6, the device for detecting the primary synchronization signal includes a capturing and storage module 21, a correlation module 22, a signal strength obtaining module 23, a normalization module 24, and a sorting module 25.

The capturing and storage module 21 obtains a time-domain signal sequence y(n) for synchronization.

The correlation module 22, coupled to the capturing and storage module 21, obtains a correlation result corresponding to the time-domain signal sequence y(n). The correlation result is a value obtained from performing a sliding correlation on the time-domain signal sequence.

More specifically, the correlation module 22 includes a phase rotation unit 221, a correlation unit 222, and a local characteristic sequence memory 223. The phase rotation unit 221, coupled to the correlation unit 222, obtains a phase rotation value corresponding to a frequency offset of the time-domain signal sequence y(n), and sends the phase rotation value to the correlation unit 222. The local characteristic sequence memory 223, coupled to the correlation unit 222, stores three sets of local characteristic sequences having different root squares. The correlation unit 222, coupled to the capturing and storage module 21, obtains the time-domain signal sequence y(n) from the capturing and storage module 21 according to a predetermined clock cycle, and conjugate multiplies the time-domain signal sequence y(n) having a first predetermined length with the local characteristic sequences obtained from the local characteristic sequence memory 223 to obtain a decorrelation value; sums up the decorrelation values according to the first predetermined length to obtain an accumulated decorrelation value corresponding to grouped decorrelation values; multiplies the phase rotation value with the accumulated decorrelation value to obtain an accumulated decorrelation value that is frequency offset eliminated; and sums up the decorrelation values that are frequency offset eliminated to obtain the correlation result.

The signal strength obtaining module 23, coupled to the capturing and storage module 21, obtains the received signal strength indicator corresponding to the time-domain signal sequence y(n). More specifically, the signal strength obtaining module 23 includes an initial signal strength obtaining unit 231, a DC offset obtaining unit 232 and a signal strength updating unit 233.

The initial signal strength obtaining unit 231, coupled to the capturing and storage module 21, obtains the time-domain signal sequence y(n) from the capturing and storage module 21, and obtains an initial received signal strength indicator according to the time-domain signal sequence y(n). The initial signal strength obtaining unit 231 obtains the $i^{th}$ initial received signal strength indicator $RSSI_{init}$ according to an equation:

$$RSSI_{init} = \sum_n |y(n)|^2,$$

where $RSSI_{init}$ corresponds to the last $i^{th}$ point of a previous time-domain signal sequence, and i is the number of points of an updating interval of the received signal strength indicator.

The DC offset obtaining unit 232, coupled to the capturing and storage module 21, obtains the time-domain signal sequence y(n) from the storage and obtaining module 21, and obtains a DC offset according to the time-domain signal sequence y(n). The DC offset obtaining unit 232 obtains the DC offset DC offset corresponding to the time-domain signal sequence according to an equation:

$$DC\_offset = \sum_n y(n).$$

The signal strength updating unit 233, coupled to the capturing and storage module 21, the initial signal strength obtaining unit 231 and the DC offset obtaining unit 232, obtains the time-domain signal sequence y(n) from the capturing and storage module 21, obtains the initial received signal strength indicator from the initial signal strength obtaining unit 231, and obtains the DC offset from the DC offset obtaining unit 232. The signal strength updating unit 233 further obtains the received signal strength indicator according to the initial received signal indicator by an updating approach, and subtracts a square of a modulus value of the DC offset from the received signal strength indicator to obtain the received signal strength indicator that is DC offset eliminated. According to an equation:

$$RSSI(m+i) = RSSI(m) + \sum_{n=m}^{m+i-1} |y(N+n)|^2 - \sum_{n=m}^{m+i-1} |y(n)|^2,$$

the signal strength updating unit 233 obtains the received signal strength indicator RSSI(m) corresponding to the time-domain signal sequence, where i is the number of points of an updating interval of the received signal strength indicator, RSSI(0) to RSSI(i−1) are obtained according to the corresponding $RSSI_{init}$, respectively, and N is a first predetermined length.

The normalization unit 24, coupled to the correlation unit 221 and the signal strength updating unit 233, obtains the correlation result from the correlation unit 221, obtains the received signal strength indicator from the signal strength updating unit 233, and obtains a ratio of the correlation result to the received signal strength indicator to obtain a normalized correlation result.

The sorting module 25, coupled to the normalization module 24, obtains the normalized correlation result from the normalization module 24, and sorts the normalized correlation result to ascertain a position of a peak value corresponding to the correlation result. The position of the peak value is a position of the primary synchronization signal.

In the embodiment, the correlation unit 22, the DC offset obtaining unit 232 and the signal strength updating unit 233 operate in parallel in one clock cycle, thereby increasing the computation speed and reducing data delay.

Figure 7:
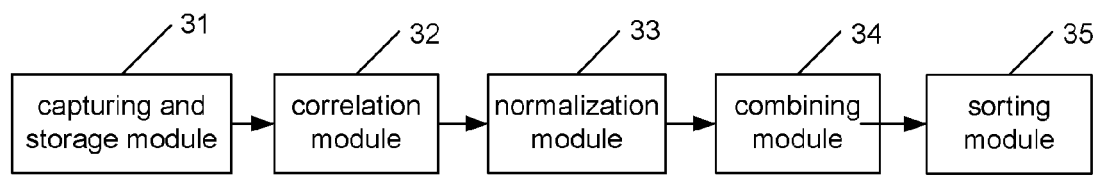
FIG. 7 is a schematic diagram of a device for detecting a primary synchronization signal according to the third embodiment of the present invention.

FIG. 7 shows a device for detecting a primary synchronization signal according to the third embodiment of the present invention. As shown in FIG. 7, the device for detecting the primary synchronization signal includes a capturing and storage module 31, a correlation module 32, a normalization module 33, a combining module 34, and a sorting module 35.

The capturing and storage module 31 obtains time-domain signal sequences corresponding to at least two antennas of a receiving terminal.

The correlation module 32, coupled to the capturing and storage module 31, obtains the time-domain signal sequences from the capturing and storage module 31, and obtains respective correlation results corresponding to the time-domain signal sequences received by at least two antennas of the receiving terminal.

The normalization module 33, coupled to the correlation module 32, obtains the correlation results from the correlation module 32, and normalizes the correlation results corresponding to the at least two antennas of the receiving terminal according to received signal strength indicators corresponding to time-domain signals.

The combining module 34, coupled to the normalization module 33, obtains the normalized correlation results from the normalization module 33, and accumulates the respective normalized correlation results corresponding to the antennas to obtain a normalized correlation result corresponding to at the at least two antennas.

The sorting module 35, coupled to the combining module 34, obtains the normalized correlation result corresponding to the at least two antennas from the combining module 34, and sorts the normalized correlation result to ascertain a position of a peak value corresponding to the correlation result. The position of the peak value is a position of the primary synchronization signal.

The functional units in the implementation or embodiments of the present invention may be integrated in one processing unit or may be physically independent. Alternatively, two or more units may be integrated into one unit. The units may be integrated in form of hardware or software function units.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for detecting a primary synchronization signal, comprising:
    a capturing and storage module, configured to capture a time-domain signal sequence for synchronization;
    a correlation module, coupled to the capturing and storage module, configured to obtain a correlation result corresponding to the time-domain signal sequence, wherein the correlation result is a value obtained from performing a sliding correlation on the time-domain signal sequence;
    a normalization module, coupled to the correlation module, configured to normalize the correlation result according to a received signal strength indicator corresponding to the time-domain signals to obtain a ratio of the correlation result to the received signal strength indicator; and
    a sorting module, coupled to the normalization module, configured to sort the normalized correlation result to ascertain a position of a peak value corresponding to the correlation result, wherein the position of the peak value is a position of the primary synchronization signal;
    wherein, the correlation result is obtained according to a correlation operation on three sets of local characteristic sequences when a sampling point is read to obtain the correlation result, and the received signal strength indicator corresponding to the time-domain signal sequence and the correlation result are obtained in parallel in a same clock cycle; and
    wherein, the correlation module comprises:
        a correlation unit, configured to conjugate multiply the time-domain signal sequence having a first predetermined length with a local characteristic sequence to obtain a decorrelation value, to group and sum up the decorrelation result according to the first predetermined length to obtain an accumulated decorrelation value corresponding to the grouped decorrelation value, and to sum up the accumulated decorrelation value to obtain the correlation result;
        a phase rotation unit, configured to obtain a phase rotation value corresponding to a frequency offset of the time-domain signal sequence;
        wherein, after the correlation unit obtains the accumulated decorrelation value corresponding to the grouped decorrelation value and before the correlation unit sums up the accumulated decorrelation value, the correlation unit further multiplies the phase rotation value with the accumulated decorrelation value to obtain the accumulated decorrelation value that is frequency offset eliminated; and wherein, said decorrelation value is a sequence having a length of the first predetermined length.

2. The device according to claim 1, further comprising:
a signal strength obtaining module, coupled to the capturing and storage module, configured to obtain the received signals strength indicator corresponding to the time-domain signal sequence in a same clock cycle in which the correlation module obtains the correlation result corresponding to the time-domain signal sequence.

3. The device according to claim 2, wherein the signal strength obtaining module comprises:
an initial signal strength obtaining module, configured to obtain an initial received signal strength indicator; and
a signal strength updating unit, coupled to the initial signal strength obtaining unit, configured to obtain the received signal strength indicator corresponding to the time-domain signal sequence according to the initial received signal strength indicator by an updating approach.

4. The device according to claim 3, wherein the signal strength obtaining module further comprises:
a DC offset obtaining unit, coupled to the capturing and storage module, configured to obtain a DC offset corresponding to the time-domain signal sequence;
wherein, after the signal strength updating unit obtains the received signal strength indicator corresponding to the time-domain signal sequence according to the initial received signal strength indicator by the updating approach, the signal strength updating unit subtracts a square of a modulus value of the DC offset from the received signal strength indicator to obtain the received signal strength indicator that is DC offset eliminated.

5. The device according to claim 1, further comprising:
a combining module, coupled to the normalization module, configured to accumulate the normalized correlation result corresponding to each of at least two antennas of a receiving terminal when the correlation result corresponding to the time-domain signal sequence of the at least two antennas of the receiving terminal is received to obtain the normalized correlation result corresponding to the at least two antennas.

6. A method for detecting a primary synchronization signal, comprising:
obtaining a time-domain signal sequence for synchronization;
obtaining a correlation result corresponding to the time-domain signal sequence, wherein the correlation result refers to a value obtained from performing a sliding correlation on the time-domain signal sequence;
normalizing the correlation result according to a received signal strength indicator corresponding to the time-domain signals to obtain a ratio of the correlation result to the received signal strength indicator;
sorting the normalized correlation result to ascertain a position of a peak value corresponding to the correlation result, wherein the position of the peak value is a position of the primary synchronization signal; and
obtaining a phase rotation value corresponding to a frequency offset of the time-domain signal sequence;
wherein, the correlation result is obtained according to a correlation operation on three sets of local characteristic sequences when a sampling point is read to obtain the correlation result, and the received signal strength indicator corresponding to the time-domain signal sequence and the correlation result are obtained in parallel in a same clock cycle; and wherein the step of obtaining the correlation result corresponding to the time-domain signal sequence comprises:
conjugate multiplying the time-domain signal sequence having a first predetermined length with a local characteristic sequence to obtain a decorrelation value;
grouping and summing up the decorrelation result according to the first predetermined length to obtain an accumulated decorrelation value corresponding to the grouped decorrelation value; and
summing up the accumulated decorrelation value to obtain the correlation result;
wherein, said decorrelation value is a sequence having a length of the first predetermined length; and
wherein, after the step of obtaining the accumulated decorrelation value corresponding to the grouped decorrelation value and before the step of summing up the accumulated decorrelation value, the method further comprises multiplying the phase rotation value with the accumulated correlation value to obtain the accumulated decorrelation value that is frequency offset eliminated.

7. The method according to claim 6, wherein the received signal strength indicator corresponding to the time-domain signal sequence is obtained according to at least steps of:
receiving an initial received signal strength indicator; and
in a same clock cycle in which the correlation result corresponding to the time-domain signal sequence is obtained according to the initial received signal strength indicator by an updating approach, obtaining the received signal strength indicator.

8. The method according to claim 7, wherein the step of obtaining the initial received signal strength indicator comprises:
obtaining an $i^{th}$ initial received signal strength indicator $RSSI_{init}$ according to an equation:

$$RSSI_{init} = \sum_{n} |y(n)|^2,$$

where $RSSI_{init}$ corresponds to a last $i^{th}$ point of a previous time-domain signal sequence; and
the step of obtaining the received signal strength indicator according to the initial received signal strength indicator by the updating approach comprises:
obtaining a received signal strength indicator RSSI(m) corresponding to the time-domain signal sequence according to an equation:

$$RSSI(m+i) = RSSI(m) + \sum_{n=m}^{m+i-1} |y(N+n)|^2 - \sum_{n=m}^{m+i-1} |y(n)|^2,$$

where i is a number of points of an updating interval of the received signal strength indicator, RSSI(0) to RSSI(i−1) are obtained according to the corresponding $RSSI_{init}$, y(n) is the time-domain signal sequence, and N is the first predetermined length.

9. The method according to claim 7, further comprising:
obtaining a DC offset corresponding to the time-domain signal sequence; and
after obtaining the received signal strength indicator corresponding to the time-domain signal sequence and before normalizing the correlation result according to the received signal strength indicator, the method further comprising:
subtracting a square of a modulus value of the DC offset from the received signal strength indicator to obtain the received signal strength indicator that is DC offset eliminated.

10. The method according to claim 9, wherein the step of obtaining the DC offset corresponding to the time-domain signal sequence comprises:
  obtaining the DC offset corresponding to the time-domain signal sequence according to an equation:

$$DC\_offset = \sum_n y(n);$$

wherein, y(n) is the time-domain signal sequence.

11. The method according to claim 6, wherein the step of obtaining the correlation result corresponding to the time-domain signal sequence comprises:
  obtaining the correlation result corresponding to the time-domain signal sequence received by at least two antennas of a receiving terminal; and
  the step of normalizing the correlation result according to the received signal strength indicator corresponding to the time-domain signals comprises:
  accumulating the correlation result of each of the antennas to obtain the normalized correlation result corresponding to the at least two antennas.

* * * * *